US011853799B2

(12) United States Patent
Liu et al.

(10) Patent No.: US 11,853,799 B2
(45) Date of Patent: *Dec. 26, 2023

(54) INITIALIZATION DATA MEMORY SPACE ALLOCATION SYSTEM

(71) Applicant: Dell Products L.P., Round Rock, TX (US)

(72) Inventors: Wei Liu, Austin, TX (US); Karl W. Rasmussen, Temple, TX (US)

(73) Assignee: Dell Products L.P., Round Rock, TX (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/950,327

(22) Filed: Sep. 22, 2022

(65) Prior Publication Data
US 2023/0020358 A1 Jan. 19, 2023

Related U.S. Application Data

(63) Continuation of application No. 16/790,863, filed on Feb. 14, 2020, now Pat. No. 11,487,581.

(51) Int. Cl.
*G06F 9/50* (2006.01)
*G06F 12/02* (2006.01)
*G06F 9/4401* (2018.01)

(52) U.S. Cl.
CPC ......... *G06F 9/5016* (2013.01); *G06F 9/4406* (2013.01); *G06F 9/4411* (2013.01); *G06F 12/0246* (2013.01)

(58) Field of Classification Search
None
See application file for complete search history.

(56) References Cited

U.S. PATENT DOCUMENTS

| | | | |
|---|---|---|---|
| 10,152,264 B1* | 12/2018 | Butcher | G06F 9/4401 |
| 2004/0158828 A1* | 8/2004 | Zimmer | G06F 9/4401 711/170 |
| 2005/0154854 A1* | 7/2005 | Hsu | G06F 12/126 711/E12.075 |
| 2005/0198464 A1* | 9/2005 | Sokolov | G06F 12/10 711/170 |
| 2014/0189272 A1* | 7/2014 | Shin | G06F 3/0619 711/162 |
| 2015/0378936 A1* | 12/2015 | Danielsson | G06F 12/1458 711/163 |

(Continued)

*Primary Examiner* — Qing Chen
(74) *Attorney, Agent, or Firm* — Joseph Mencher

(57) ABSTRACT

An initialization data memory space allocation system includes a memory system having a memory space that includes an initialization data bucket that reserves a contiguous subset of the memory space for initialization data. Each initialization engine that is coupled to the memory system is configured during initialization operations to allocate, for that initialization engine, a portion of the contiguous subset of the memory space reserved by the initialization data bucket, and then store initialization data in that portion of the contiguous subset of the memory space reserved by the initialization data bucket. A runtime engine that is coupled to the memory system is configured, during runtime operations, to claim the contiguous subset of the memory space reserved for initialization data by the initialization data bucket for runtime data, and store runtime data in at least a portion of the contiguous subset of the memory space.

20 Claims, 13 Drawing Sheets

(56) References Cited

U.S. PATENT DOCUMENTS

2020/0133732 A1\* 4/2020 Kondiles ............... G06F 9/5077
2020/0363974 A1\* 11/2020 Wei ....................... G06F 3/0604
2020/0379843 A1\* 12/2020 Chao ..................... G06F 11/106

\* cited by examiner

INITIALIZATION DATA MEMORY SPACE ALLOCATION SYSTEM

CROSS-REFERENCE TO RELATED APPLICATIONS

The present disclosure is a continuation of U.S. patent application Ser. No. 16/790,863 (now U.S. Pat. No. 11,487, 581), filed Feb. 14, 2020, the disclosure of which is incorporated by reference herein in its entirety.

BACKGROUND

The present disclosure relates generally to information handling systems, and more particularly to allocating memory space in an information handling system for initialization data.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, perform initialization operations in order to initialize the computing device so that the computing device may enter a runtime environment. During the initialization operations discussed above, memory space in the main memory system (e.g., Dynamic Random Access Memory (DRAM) devices) may be allocated for the Basic Input/Output System (BIOS) and/or firmware drivers (e.g., UEFI firmware drivers) for use during initialization of the computing device. However, as would be understood by one of skill in the art in possession of the present disclosure, memory space allocated by the BIOS and/or firmware drivers during initialization may become fragmented due to a variety of reasons. For example, a firmware driver may be allocated a contiguous region or range of the memory space (e.g., adjacent memory blocks in the memory space) during initialization and, when that firmware driver is finished utilizing that contiguous region of the memory space, the firmware driver may only release some of the memory blocks in that contiguous region of the memory space (e.g., the "middle" memory blocks bounded on each side by memory blocks that are not released by that firmware driver.) Thus, when another firmware driver attempts to allocate a contiguous region of the memory space, those released memory block(s) will not be used for that allocation.

Repeated situations like that discussed above create a fragmented memory space, which can lead to reduced computing device performance due to, for example, the need for firmware drivers to review relatively large amounts of available memory space to find a contiguous region of the memory space for allocation, and the possibility that no contiguous region of the memory space exists that satisfies the allocation requirements for a firmware driver. Furthermore, such fragmented memory spaces can expose bugs in firmware drivers. For example, relatively high levels of fragmentation may require the processing system (e.g., a Direct eXecution Environment (DXE) core in the processing system) to use a relatively large number of descriptors in a memory map to identify the memory space to the Operating System (OS) in the computing device, which has been found to produced unexpected behavior with some OSs due to, for example, limitations in their OS loader code.

Accordingly, it would be desirable to provide an initialization data memory space allocation system that addresses the issues discussed above.

SUMMARY

According to one embodiment, an Information Handling System (IHS) includes a processing system that is configured to: define an initialization data bucket that reserves a contiguous subset of a memory space provided by a memory system for initialization data; and execute instructions to cause the processing system to provide: at least one initialization engine, wherein each initialization engine is configured, during initialization operations, to: allocate, for that initialization engine, a portion of the contiguous subset of the memory space reserved by the initialization data bucket; and store initialization data in that portion of the contiguous subset of the memory space reserved by the initialization data bucket; and a runtime engine that is coupled to the memory system and that is configured, during runtime operations, to: claim the contiguous subset of the memory space reserved for initialization data by the initialization data bucket for runtime data; and store runtime data in at least a portion of the contiguous subset of the memory space.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
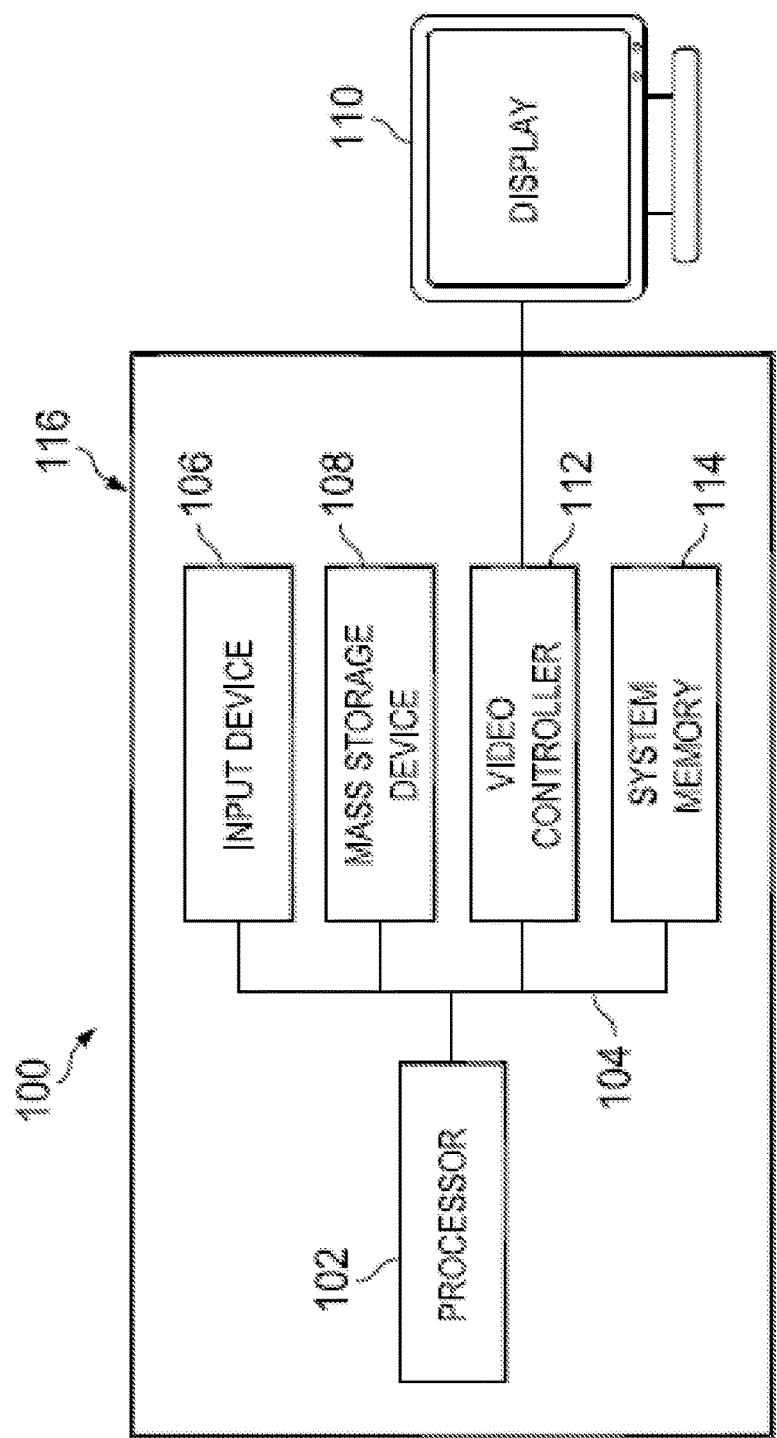
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
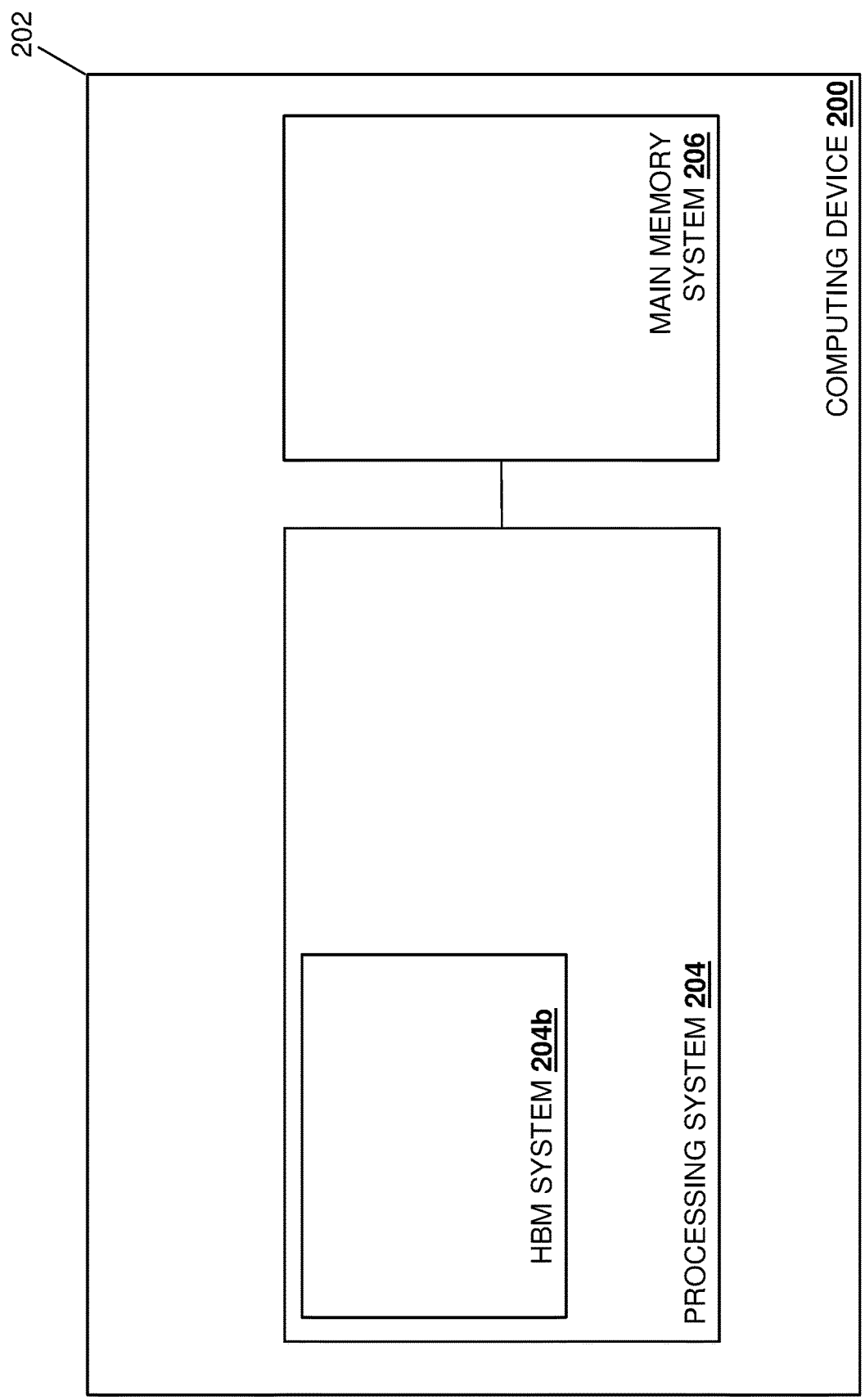
FIG. 2 is a schematic view illustrating an embodiment of a computing device that provides the initialization data memory space allocation system of the present disclosure.

Referring now to FIG. 2, an embodiment of a computing device 200 is illustrated that may provide the initialization data memory space allocation system of the present disclosure. In an embodiment, the computing device 200 may be provided by the IHS 100 discussed above with reference to FIG. 1 and/or may include some or all of the components of the IHS 100, and in specific examples may be provided by a server device, a desktop computing device, a laptop/notebook computing device, a tablet computing device, a mobile phone, and/or other computing devices that would be apparent to one of skill in the art in possession of the present disclosure. Furthermore, while one of skill in the art in possession of the present disclosure will recognize that the computing device 200 is illustrated and discussed below as being provided by server device, the functionality of the computing device 200 discussed below may be provided by other devices that are configured to operate similarly as computing device 200 discussed below. In the illustrated embodiment, the computing device 200 includes a chassis 202 that houses the components of the computing device 200, only some of which are illustrated below.

For example, the chassis 202 may house a processing system 204 (e.g., that may include the processor 102 discussed above with reference to FIG. 1) that, in some of the embodiments discussed below, may include processing subsystem(s) such as the High Bandwidth Memory (HBM) system illustrated in FIG. 2, which one of skill in the art in possession of the present disclosure will appreciate may be included in processing systems available from ADVANCED MICRO DEVICES® Inc. of Santa Clara, California, United States. However, one of skill in the art in possession of the present disclosure will appreciate that some of the embodiments below do not utilize the HBM system 204*a*, and thus its inclusion with the processing system 204 may be optional. Furthermore, in addition to the optional HBM system 204*a*, the processing system 204 may include other processing subsystems such as the Driver eXecution Environment (DXE) core discussed below, other processing systems cores known in the art, a chipset, and/or any other processing subsystems that one of skill in the art in possession of the present disclosure would recognize that being capable of providing the BIOS sub-engine(s), operating system sub-engine, and/or other processing system functionality discussed below.

The chassis 202 may also house a main memory system 206 that is coupled to the processing system 206 and that may be provided by Dynamic Random Access Memory (DRAM) devices and/or other main memory subsystems that would be apparent to one of skill in the art in possession of the present disclosure. However, while two specific memory systems are illustrated and described in FIG. 2, one of skill in the art in possession of the present disclosure will recognize that other memory systems may be utilized in place of those illustrated in FIG. 2 while remaining within the scope of the present disclosure as well. Furthermore, while a specific computing device 200 has been illustrated, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3:
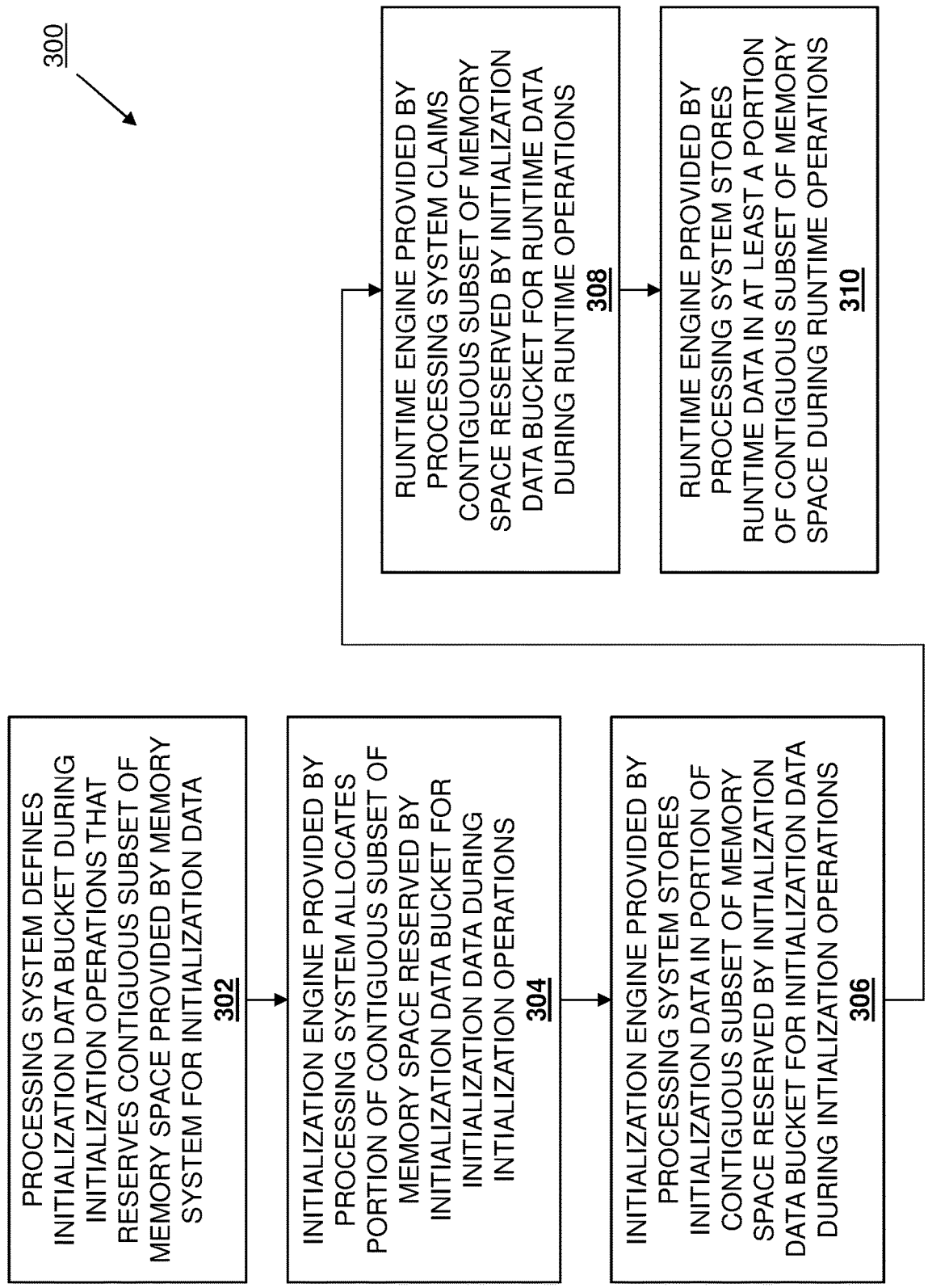
FIG. 3 is a flow chart illustrating an embodiment of a method for allocating memory space for initialization data.

Referring now to FIG. 3, an embodiment of a method 300 for allocating memory space for initialization data is illustrated. As discussed below, the systems and methods of the present disclosure provide for the creation of an initialization data bucket that reserves a subset of the memory space provided by a memory system in a computing device for initialization data, and then the allocation of portions of that subset of the memory space for initialization engines in the computing device, and the use of those portions of that subset of the memory space by the initialization engines for which they were allocated in order to store initialization data during initialization operations. Upon the completion of the initialization operations such that the computing device enters a runtime environment, an Operating System (OS) engine in the computing device may then claim the subset of the memory space that was previously reserved by the initialization data bucket for initialization data, and store runtime data in that subset of the memory space during runtime operations. As will be appreciated by one of skill in the art in possession of the present disclosure, the use of the initialization data bucket during initialization operations as described herein confines any fragmentation that results from the allocation and use of the memory space by the initialization engines to the subset of memory space reserved by the initialization data bucket, thus increasing computing device performance by reducing the need to review relatively large amounts of available memory space to find a contiguous region of the memory space for allocation, and requiring relatively smaller number of descriptors in a memory map to identify the memory space to the OS engine in a manner that prevents unexpected behavior with some OS engines that may be a result of, for example, limitations in their OS loader code.

The method 300 begins at block 302 where, during initialization operations, a processing system defines an initialization data bucket that reserves a contiguous subset of memory space provided by a memory system for initialization data. In an embodiment, at or prior to the block 302, the computing device 200 may be powered on, booted, reset, and/otherwise initialized such that initialization operations for the computing device 200 begin. As will be appreciated by one of skill in the art in possession of the present disclosure, in a specific example, some initialization operations for the computing device 200 may include a chipset in the processing system 204 executing initialization code (e.g., Basic Input/Output System (BIOS) code) stored on a Serial Peripheral Interface (SPI) flash memory device (not illustrated) in order to provide a BIOS engine that operates to copy the BIOS code from the SPI flash memory device to the main memory system 206 (e.g., to a DRAM device), followed by one or more cores in a Central Processing Unit (CPU) in the processing system 204 executing the BIOS code that was copied to the main memory system 204 to provide the BIOS engine that performs, along with firmware drivers, a variety of initialization operations (e.g., Power On Self Test (POST), etc.) to initialize the computing device 200.

Figure 4:
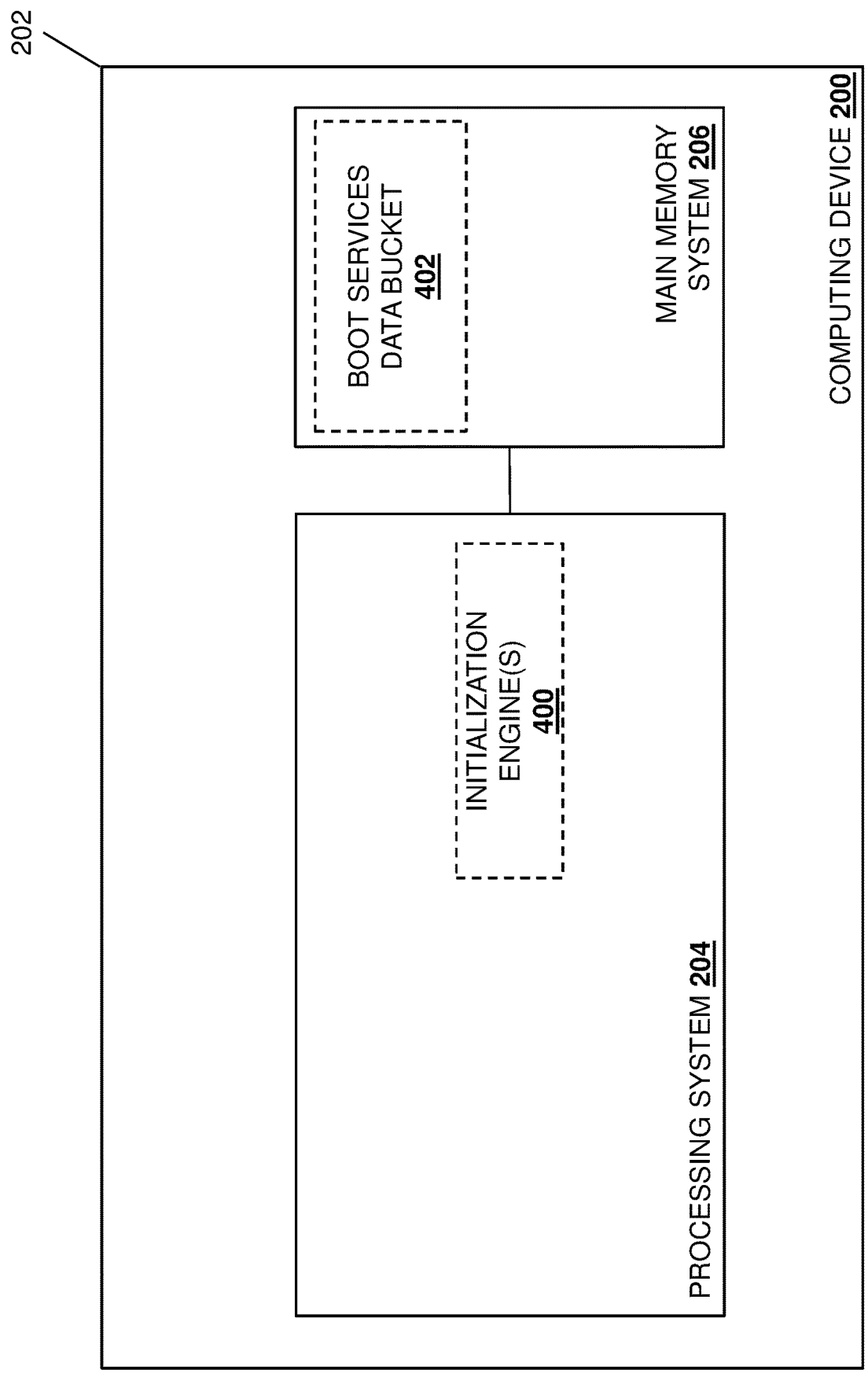
FIG. 4 is a schematic view illustrating an embodiment of the computing device of FIG. 2 operating during the method of FIG. 3.
Figure 5:
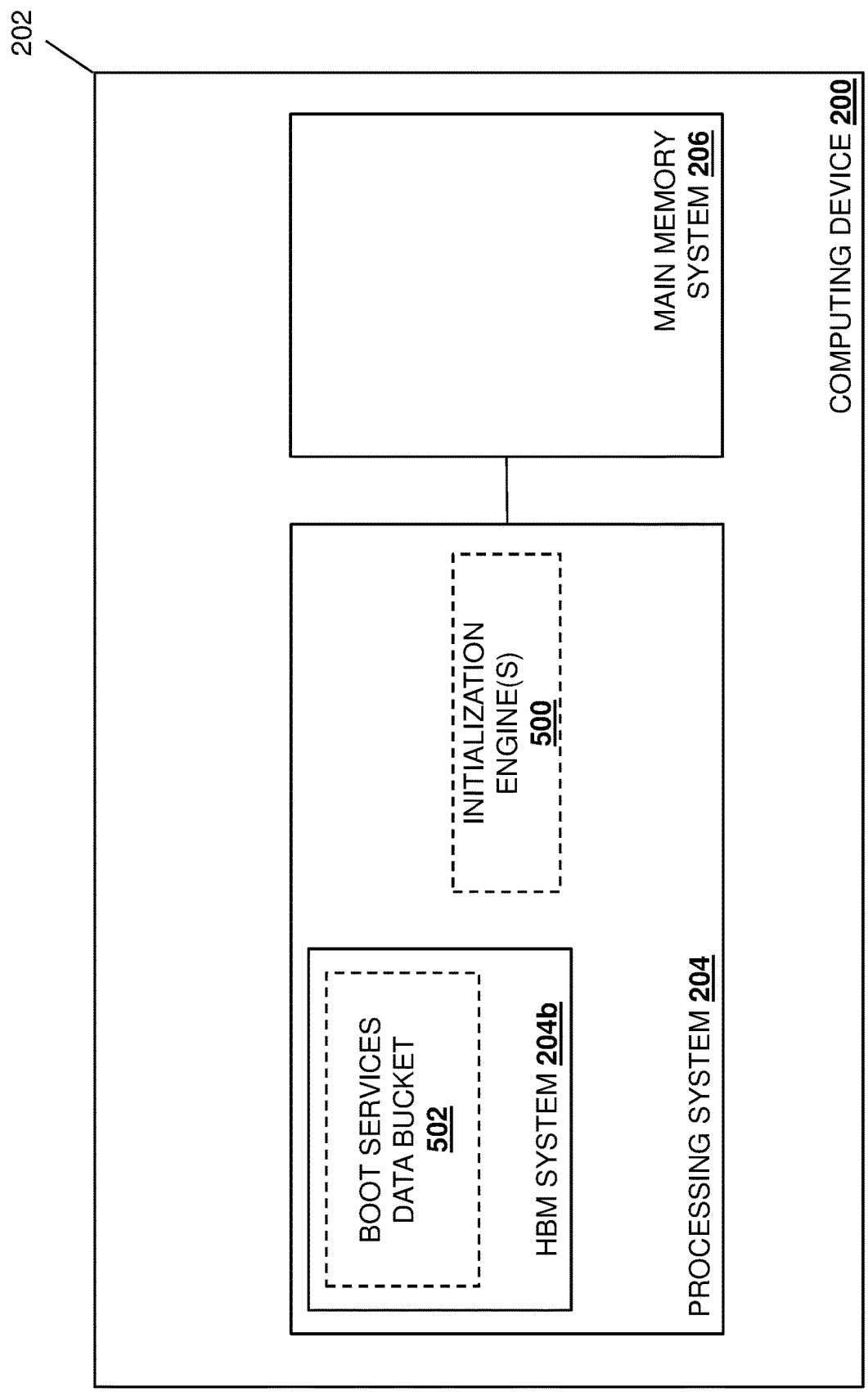
FIG. 5 is a schematic view illustrating an embodiment of the computing device of FIG. 2 operating during the method of FIG. 3.

For example, FIGS. 4 and 5 illustrate how the processing system 204 may operate to provide one or more initialization engine(s) 400 and 500, respectively, that may include the BIOS engine and firmware drivers discussed above, as well as any other subsystem that one of skill in the art in possession of the present disclosure would appreciate may be allocated memory space during initialization operations for use in storing initialization data. As will be appreciated by one of skill in the art in possession of the present disclosure, the BIOS engine described herein may be provided by a Unified Extensible Firmware Interface (UEFI) engine that was created as a replacement for legacy BIOS systems and that defines a software interface between an operating system and firmware in the computing device 204, and the firmware drivers may be UEFI drivers.

Thus, in an embodiment of block 302, the processing system 204 may define an initialization data bucket that reserves a contiguous subset or range of memory space provided by a memory system in the computing device 200 for the storage of initialization data by the initialization engine(s) 400/500. For example, prior to the initialization of the main memory system 206, a Driver eXecution Environment (DXE) core in the processing system 204 may operate to define the initialization data bucket by generating a memory map of the memory system including the initialization data bucket that will be reserved for the storage of initialization data by the initialization engines. FIG. 4 illustrates an embodiment in which the optional HBM system 204a discussed above with reference to FIG. 2 is not provided with the processing system 204, and the processing system 204 has defined the initialization data bucket as a boot services data bucket 402 that reserves a contiguous subset or range of memory space provided by the main memory system 206 in the computing device 200 for the storage of boot services data by the initialization engine(s) 400. FIG. 5 illustrates an embodiment in which the optional HBM system 204a discussed above with reference to FIG. 2 is provided with the processing system 204, and the processing system 204 has defined the initialization data bucket as a boot services data bucket 502 that reserves a contiguous subset or range of memory space provided by the HBM system 204b in the computing device 200 for the storage of boot services data by the initialization engine(s) 500. As will be appreciated by one of skill in the art in possession of the present disclosure, boot services data may include any data generated and stored by a BIOS engine and/or firmware drivers during "boot services" that are defined by the UEFI specification and that are available when firmware "owns" the computing device platform. However, while specific initialization data is described, one of skill in the art in possession of the present disclosure will appreciate that other initialization data may fall within the scope of the present disclosure as well.

Figure 6A:
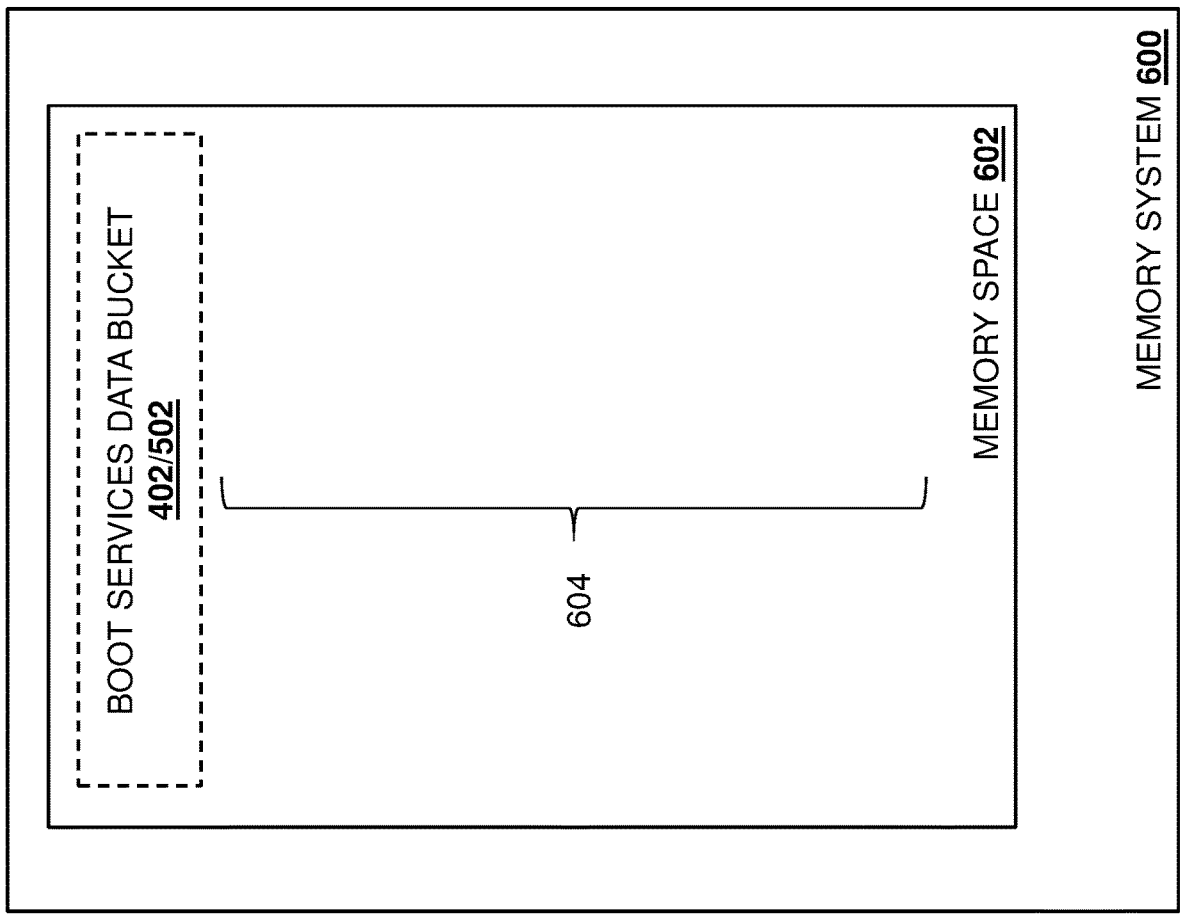
FIG. 6A is a schematic view illustrating an embodiment of a memory system in the computing device of FIG. 2 during the method of FIG. 3.
Figure 6B:
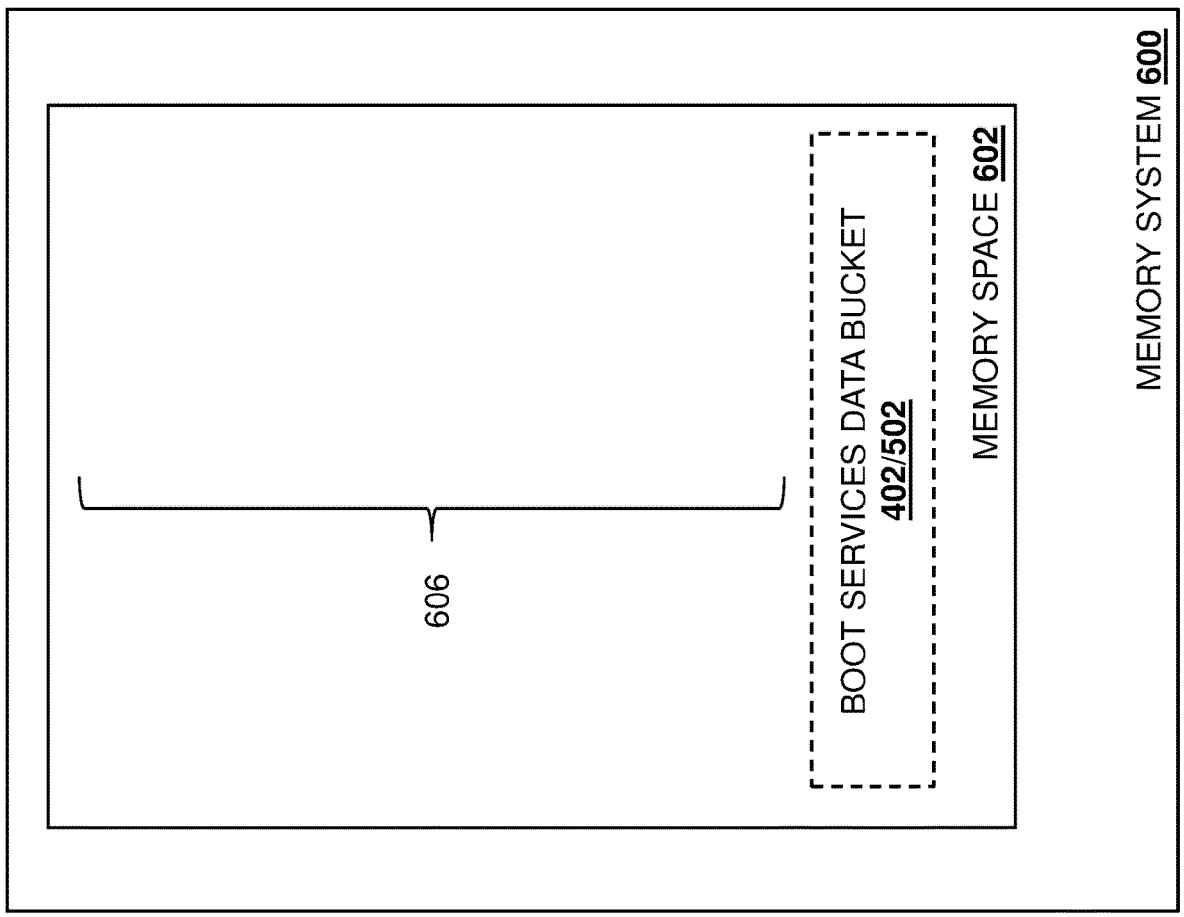
FIG. 6B is a schematic view illustrating an embodiment of a memory system in the computing device of FIG. 2 during the method of FIG. 3.

Referring now to FIGS. 6A and 6B, a memory system 600 is illustrated that may be provided by the main memory system 206 or the HBM system 204a discussed above with reference to FIG. 2, and that is associated with a memory space 602. FIG. 6A illustrates how the boot services data buckets 402 or 502 may be defined by the processing system 204 at block 302 such that the boot services data bucket 402 or 502 provides an "edge" of the memory space 602 provided by the memory system 600 (e.g., a range of the memory space that starts with the first memory block described by the memory space 602), which results in the remainder 604 of the memory space being provided by a contiguous subset of the memory space 602 that is located adjacent the boot services data bucket 402 or 502 (e.g., "below" that boot services data bucket in FIG. 6A.) Similarly, FIG. 6B illustrates how the boot services data buckets 402 or 502 may be defined by the processing system 204 at block 302 such that the boot services data bucket 402 or 502 provides an "edge" of the memory space 602 provided by the memory system 600 (e.g., a range of the memory space that ends with the last memory block described by the memory space 602), which results in the remainder 606 of the memory space being provided by a contiguous subset of the memory space 602 that is located adjacent the boot services data bucket 402 or 502 (e.g., "above" that boot services data bucket in FIG. 6A.) One of skill in the art in possession of the present disclosure will appreciate that the examples illustrated in FIGS. 6A and 6B define the boot services bucket in a contiguous region or range (e.g., ajdacent the "top" or "bottom") of the memory space 602 in order to provide the largest possible remaining subset of memory space that is contiguous, which may be beneficial for subsystems that require relatively large memory allocations (e.g., LINUX® OS loaders that utilize approximately 2 GB of memory during initialization of the computing device.) However, other locations for the boot services data bucket in the memory space may be utilized (e.g., in the "middle" of the memory space) if it is known that the remaining subsets of contiguous memory space are sufficient for the needs of the subsystems that will utilize that memory space during initialization operations.

The method 300 then proceeds to block 304 where, during initialization operations, an initialization engine provided by the processing system allocates a portion of the contiguous subset of the memory space reserved by the initialization data bucket for initialization data. In an embodiment, at block 304, any of the initialization engines 400 or 500 may operate during the initialization operations to allocate a portion of the contiguous subset or range of the memory space reserved by the boot services data bucket 402 or 502, respectively. For example, while the computing device 200 is in an initialization environment, the BIOS engine, firmware driver(s), or other initialization engine(s) 400 or 500 may operate to allocate respective portions of the contiguous subset of the memory space reserved by the boot services data buckets 402 or 502 for use in storing initialization data utilized by the BIOS engine, firmware driver(s), or other initialization engine(s) 400 or 500. As such, in some embodiments and following block 304, each of the initialization engines 400 or 500 may be allocated a portion of the subset of memory space that is reserved by the initialization/boot services data bucket 402 or 502, respectively.

As will be appreciated by one of skill in the art in possession of the present disclosure, a relatively large number of firmware drivers or other initialization engines may be loaded while the computing device 200 is in the runtime environment, which can result in the allocation of a relatively large amount (and in some cases, all) of the subset of the memory space that is reserved by the initialization/boot services data bucket. In some embodiments, in the event that all of the subset of the memory space that is reserved by the initialization data bucket 402 or 502 is allocated to initialization engines 400 or 500, additional initialization engines (e.g., firmware drivers) that require memory space allocation may then begin to allocation portions of the memory space that is not reserved by the initialization data bucket. Furthermore, in the event that the allocation of the subset of the memory space that is reserved by the initialization data bucket 402 or 502 to initialization engines 400 or 500 results in the initialization data bucket not including any contiguous memory space that is sufficient for an initialization engines' memory allocation requirement, additional initialization engines (e.g., firmware drivers) that require memory space allocation may then begin to allocation portions of the memory space that is not reserved by the initialization data bucket. While a few specific examples are provided, one of skill in the art in possession of the present disclosure will appreciate that other scenarios that require an initialization engine to allocate itself memory space outside of the subset of memory space reserved by the initialization data bucket will fall within the scope of the present disclosure as well.

Figure 7:
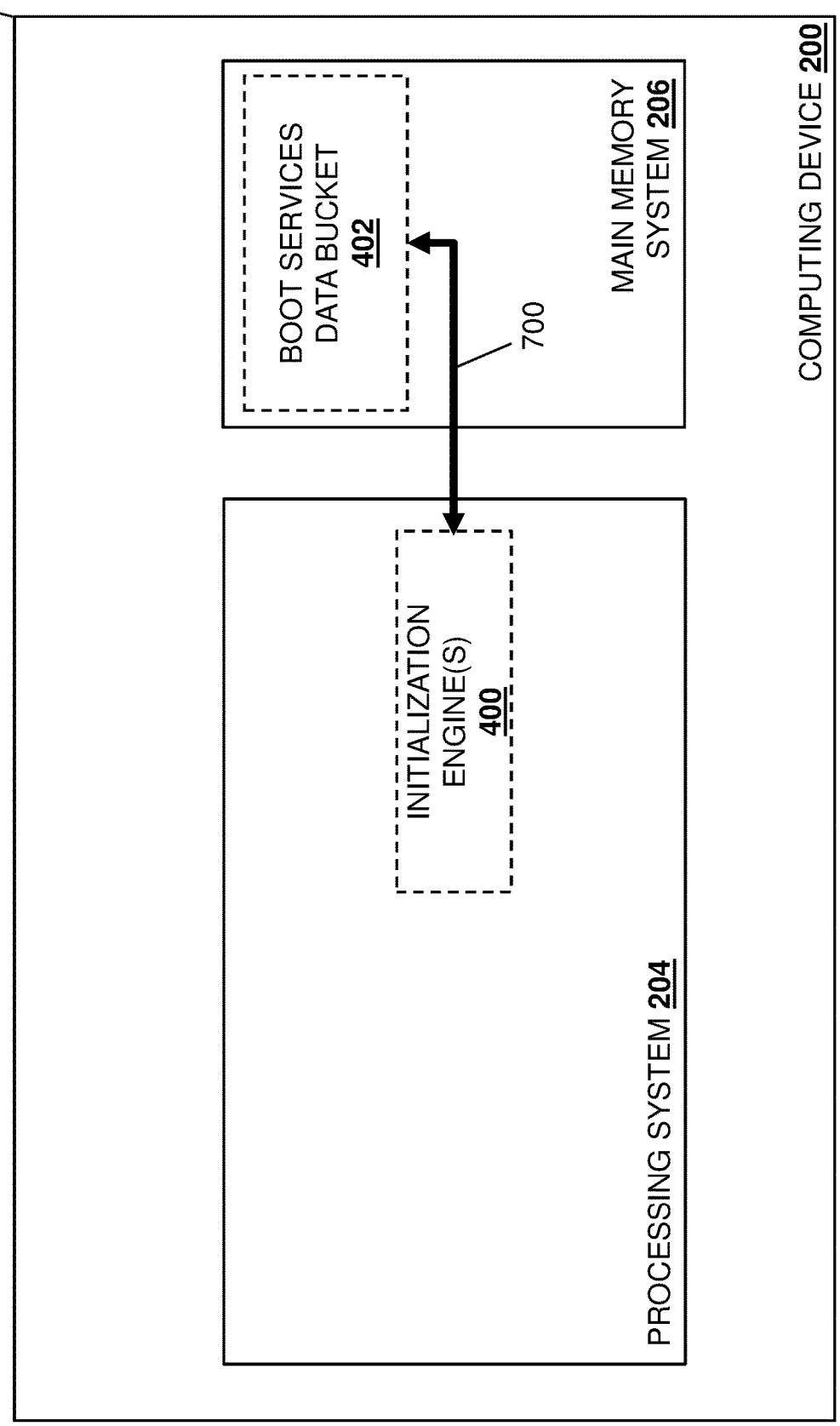
FIG. 7 is a schematic view illustrating an embodiment of the computing device of FIG. 2 operating during the method of FIG. 3.
Figure 8:
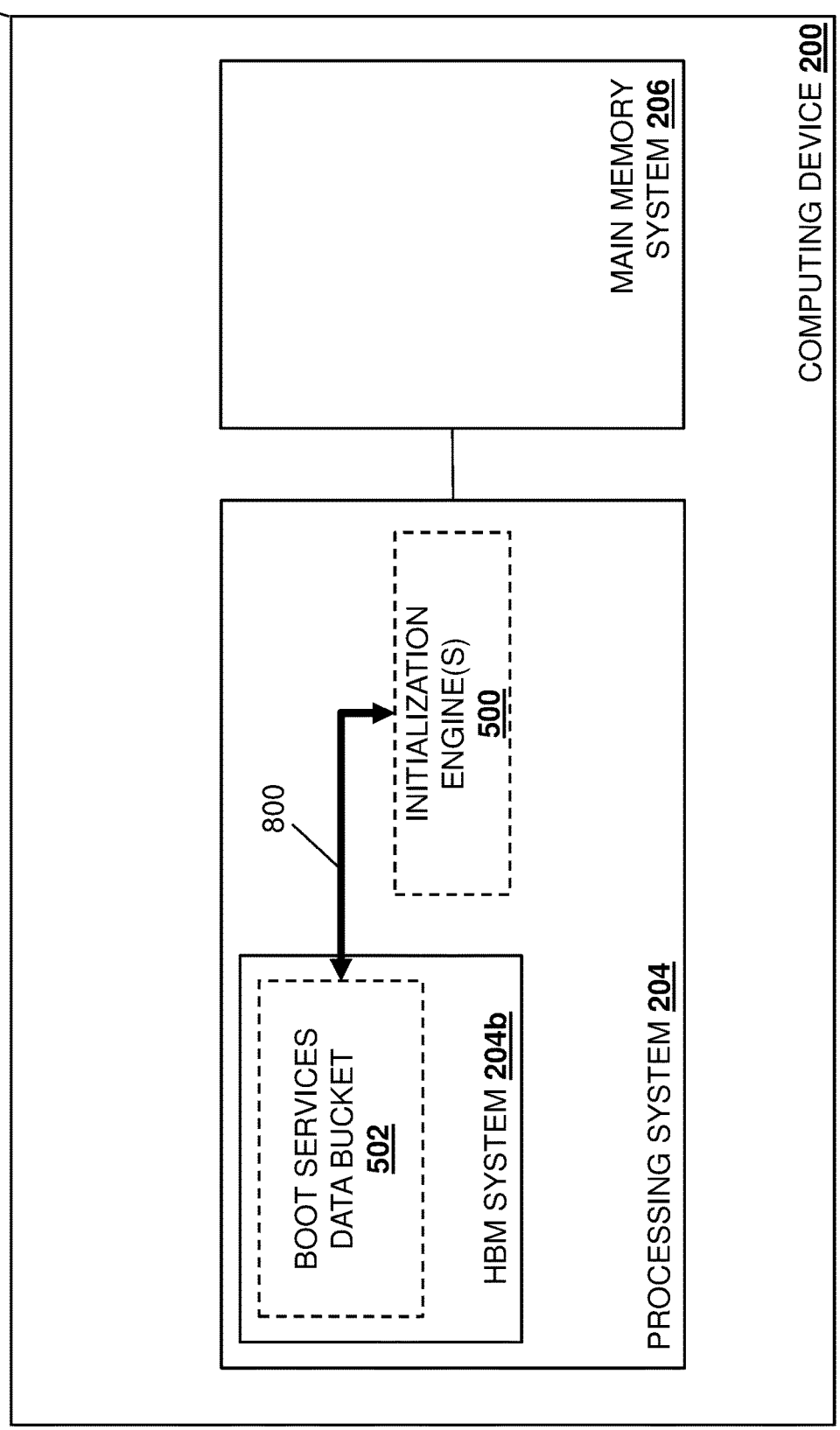
FIG. 8 is a schematic view illustrating an embodiment of the computing device of FIG. 2 operating during the method of FIG. 3.

The method 300 then proceeds to block 306 where, during initialization operations, the initialization engine provided by the processing system stores initialization data in the portion of the contiguous subset of the memory space reserved by the initialization data bucket for initialization data. In an embodiment, at block 306, each of the initialization engines 400 or 500 that were allocated a portion of the subset of memory space reserved by the initialization/boot service data bucket 402 or 502, respectively, may operate to perform initialization operations that include the storage of initialization/boot services data in their respective portion of the subset of memory space reserved by the initialization/boot service data bucket 402 or 502. 00. For example, FIG. 7 illustrates each of the initialization engines 400 performing storage operations 700 during the initialization of the computing device 200 in order to store data in its respectively allocated portion of the subset of the memory space reserved by the boot services data bucket 402 defined in the main memory system 206. In another example, FIG. 8 illustrates each of the initialization engines 500 performing storage operations 800 during the initialization of the computing device 200 in order to store data in its respective allocated portion of the subset of the memory space reserved by the boot services data bucket 402 defined in the HBM system 204b.

As such, as will be appreciated by one of skill in the art in possession of the present disclosure, the initialization engines 400 or 500 may operate to utilize memory blocks in their respective portions of the subset of memory space reserved by the initialization/boot service data bucket 402 or 502, release some of those memory blocks for use by other initialization engines, and/or perform a variety of other operations that result in fragmentation of the subset of memory space reserved by the initialization/boot service data bucket 402 or 502, but that fragmentation is generally limited to the subset of memory space reserved by the initialization/boot service data bucket 402 or 502 (e.g., that fragmentation may be completely limited to the subset of memory space reserved by the initialization/boot service data bucket when only that subset of memory space reserved by the initialization/boot service data bucket is allocated to initialization engines, or that fragmentation may be primarily limited to the subset of memory space reserved by the initialization/boot service data bucket when portions of the memory space outside that subset of memory space reserved by the initialization/boot service data bucket are allocated to some initialization engines).

Figure 9:
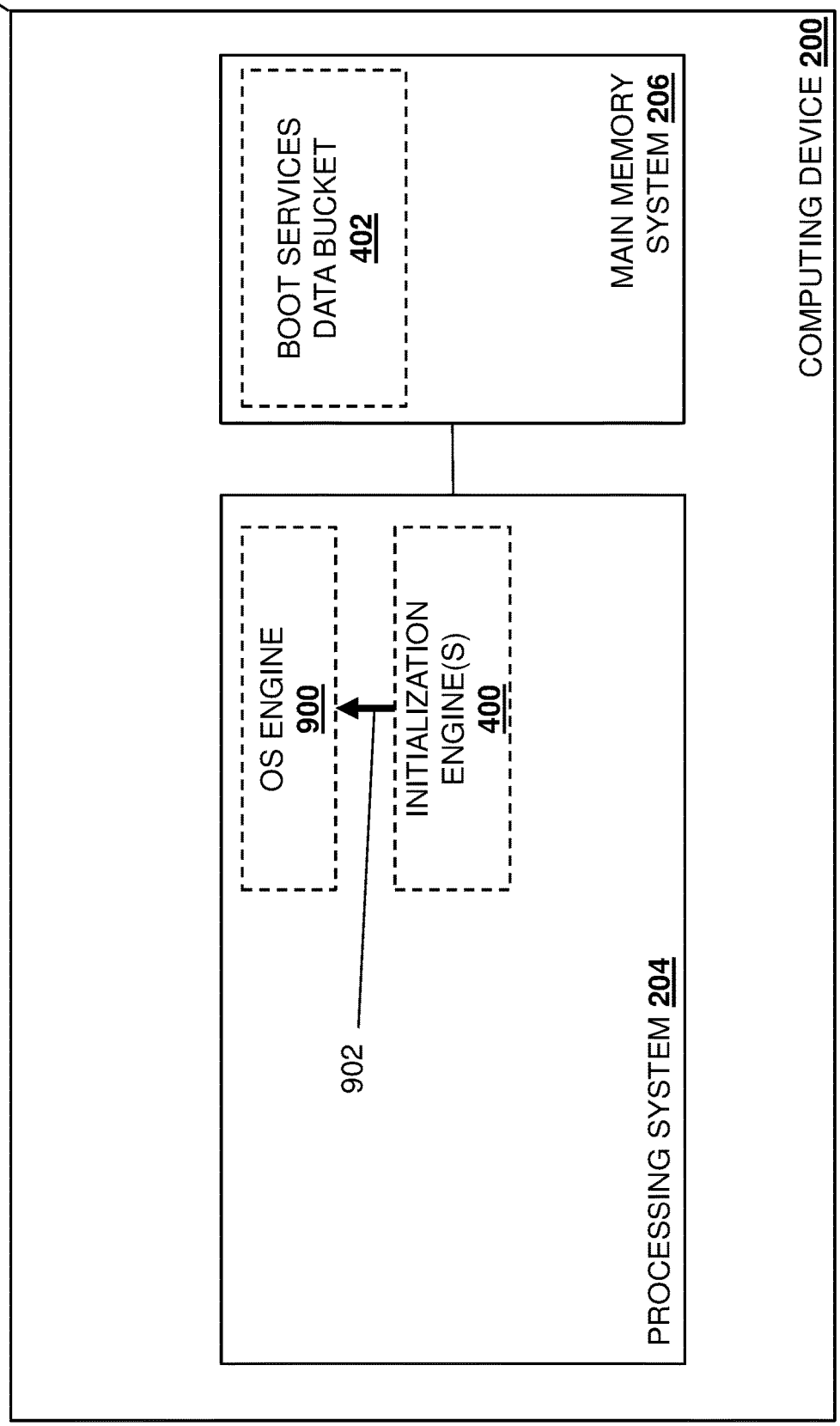
FIG. 9 is a schematic view illustrating an embodiment of the computing device of FIG. 2 operating during the method of FIG. 3.
Figure 10:
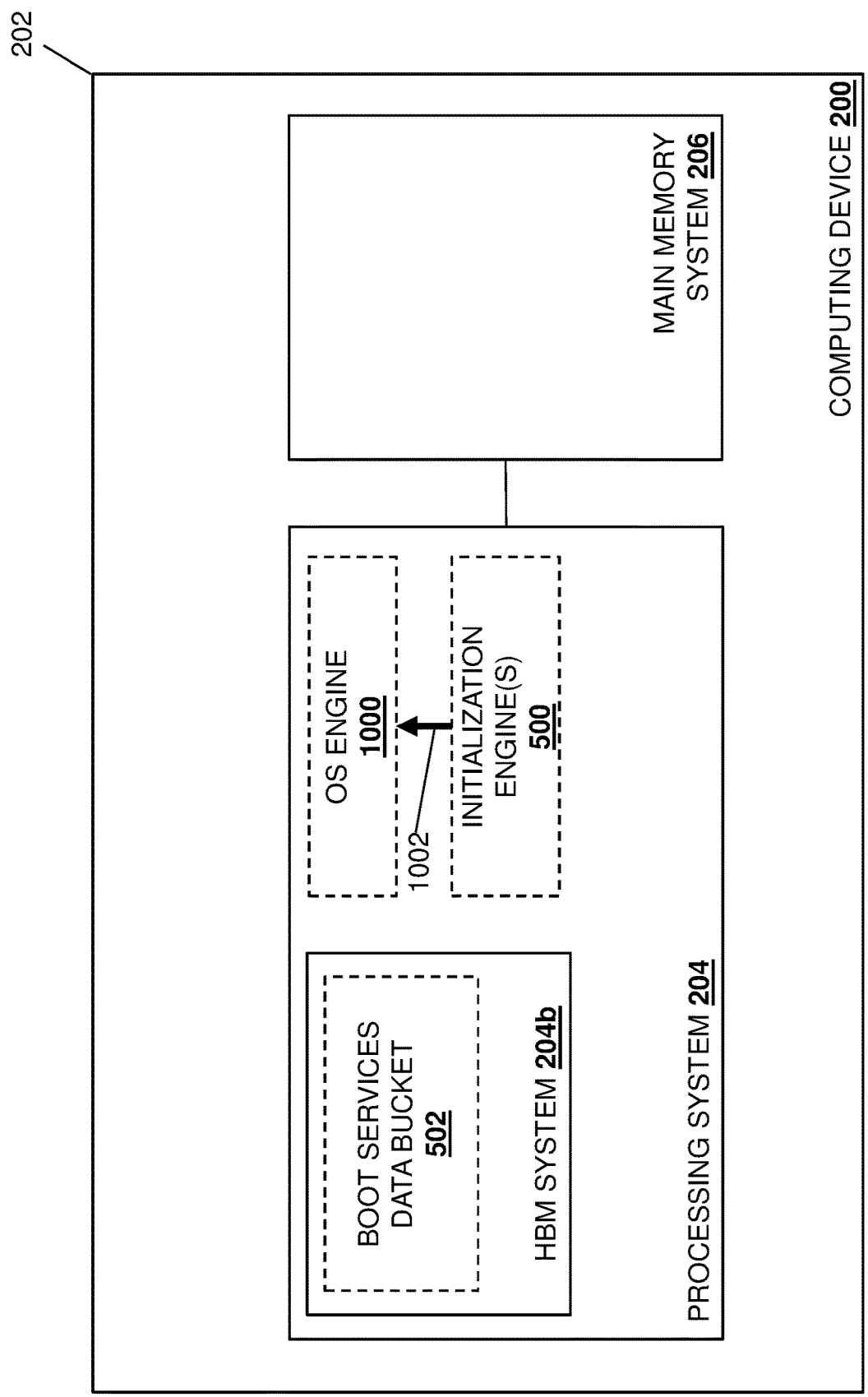
FIG. 10 is a schematic view illustrating an embodiment of the computing device of FIG. 2 operating during the method of FIG. 3.

The method 300 then proceeds to block 308 where, during runtime operations, a runtime engine provided by the processing system claims the contiguous subset of the memory space reserved by the initialization data bucket for runtime data. In an embodiment, during or prior to block 308, the initialization operations for the computing device 200 may be completed, and the computing device 200 may enter a runtime environment in which the processing system operates to provide a runtime engine. For example, FIG. 9 illustrates how, subsequent to the initialization of the computing device 200, the processing system 204 may operate to execute instructions (e.g., included on the main memory system 206) to provide an operating system engine 900. Similarly, FIG. 10 illustrates how, subsequent to the initialization of the computing device 200, the processing system 204 may operate to execute instructions (e.g., included on the main memory system 206) to provide an operating system engine 1000.

In an embodiment, upon provisioning of the operating system engine 900 or 1000, a DXE core included in the processing system 204 may operate to report the contiguous region or range of the memory space defined by the initialization data bucket to the OS engine 900 or 1000. For example, FIG. 9 illustrates how the DXE core in the processing system 204 may provide an initialization engine 400 (e.g., the BIOS engine discussed above) to perform reporting operations 902 that operate to report the contiguous subset of the memory space reserved by the boot services bucket 402 to the OS engine 900, and FIG. 10 illustrates how the DXE core in the processing system 204 may provide an initialization engine 500 (e.g., the BIOS engine discussed above) to perform reporting operations 1002 that operate to report the contiguous subset of the memory space reserved by the boot services bucket 502 to the OS engine 1000 (e.g., in response to an OS loader calling "EFI_BOOT_SERVICES.GetMemoryMap( )" to retrieve a memory map.) As will be appreciated by one of skill in the art in possession of the present disclosure, while the allocation of portions of the subset of memory space reserved by the boot services buckets 402 or 500 may be fragmented from the point of view of the BIOS engine, the reporting of the contiguous subset of the memory space reserved by the boot services bucket 402 or 502 eliminates the need to use a relatively large number of descriptors in a memory map to identify the memory space to the OS engine, and thus the possibility of unexpected behavior with some OS engines that may result from limitations in their OS loader code is eliminated.

Figure 11:
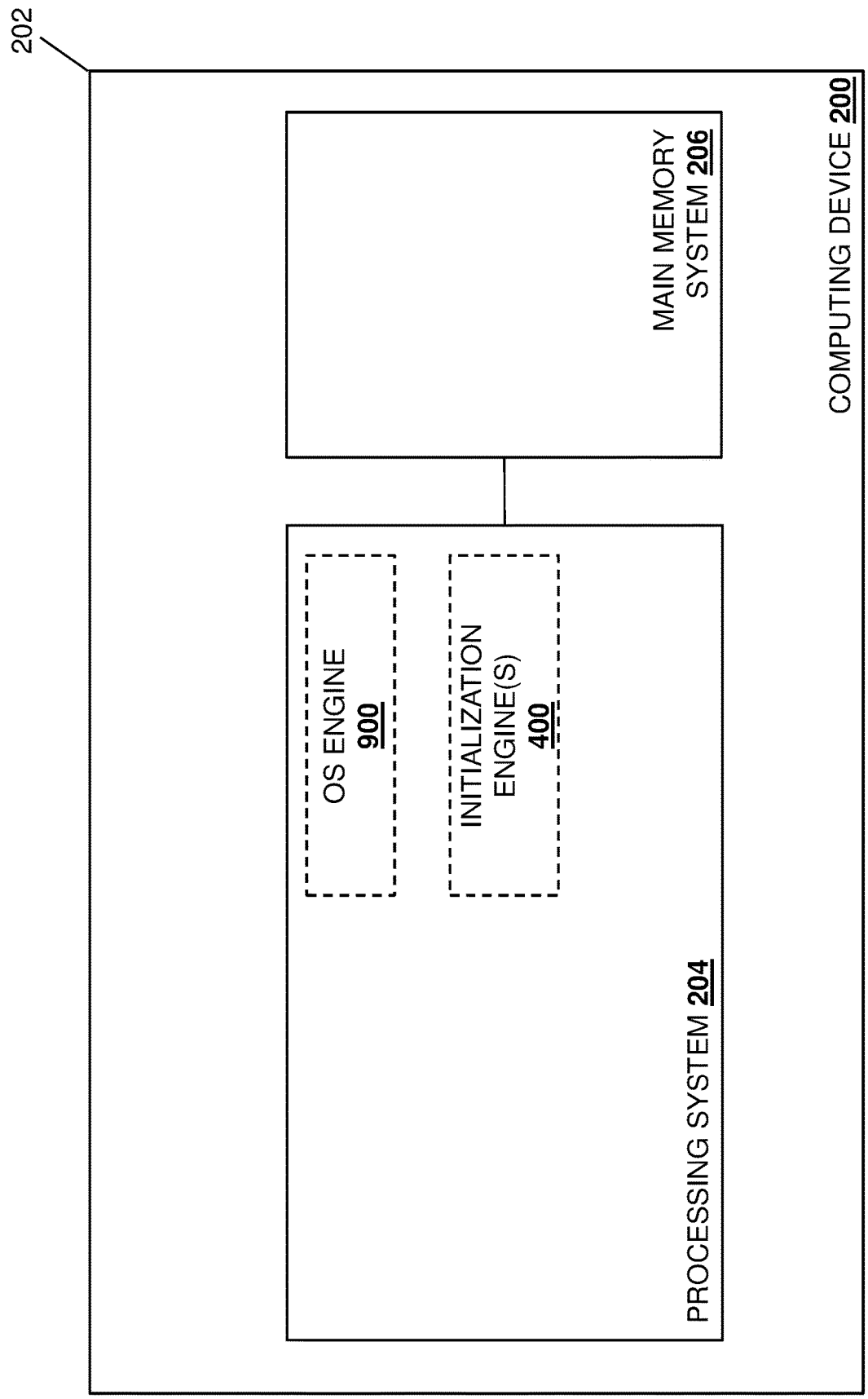
FIG. 11 is a schematic view illustrating an embodiment of the computing device of FIG. 2 operating during the method of FIG. 3.
Figure 12:
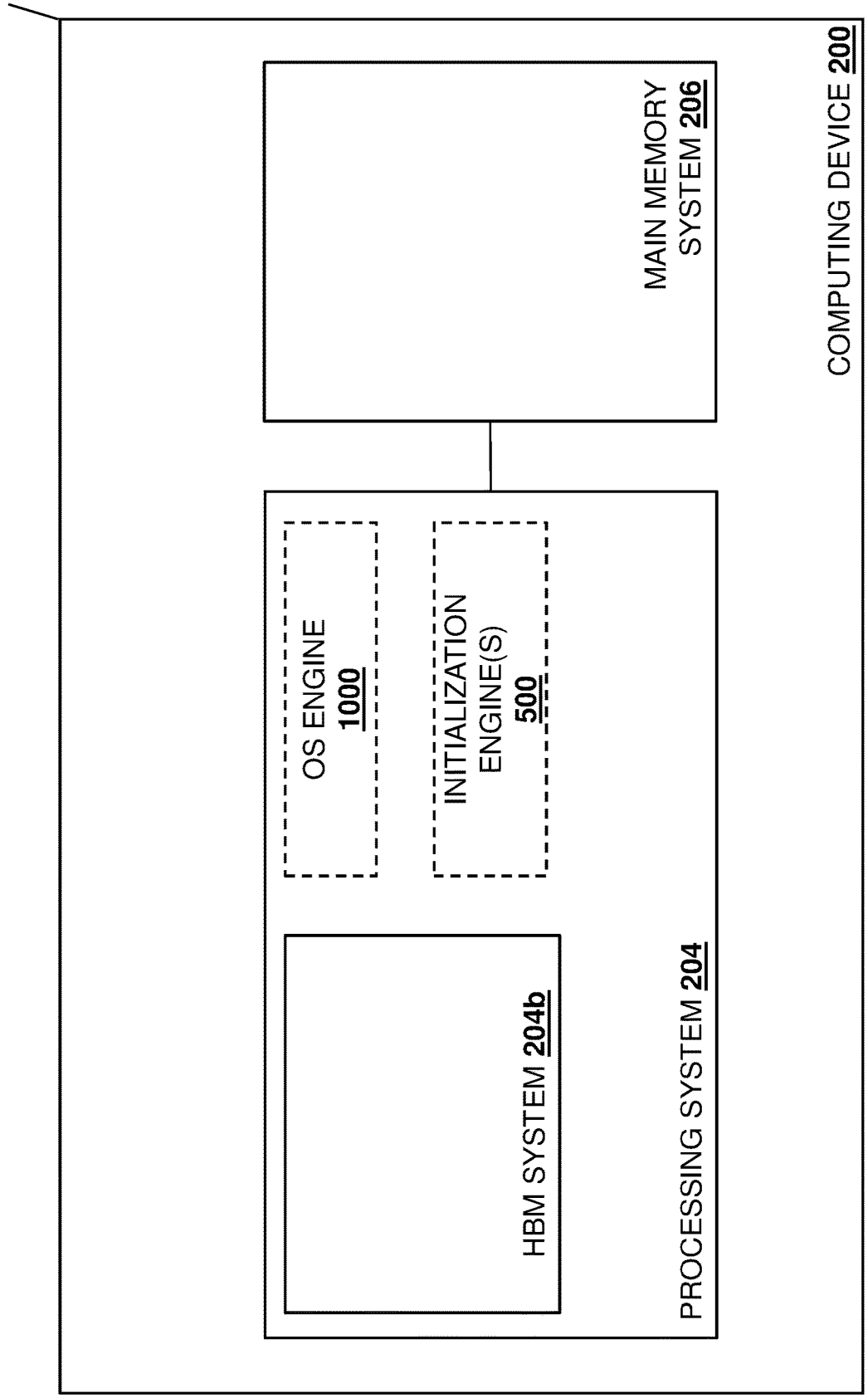
FIG. 12 is a schematic view illustrating an embodiment of the computing device of FIG. 2 operating during the method of FIG. 3.

Following the reporting of the subset of the memory space reserved by the initialization data bucket at block 308, the runtime engine may operate to claim that subset of the memory space for use in storing runtime data during runtime operations. As will be appreciated by one of skill in the art in possession of the present disclosure, the memory space utilized for Boot Services Data may be utilized by the OS engine once the OS engine takes control of the system memory (e.g., the OS engine may use the memory region previously marked by the BIOS as Boot Services Data in order to load its kernel image.) As such, at block 308, the runtime engine may operate to perform a variety of operations that one of skill in the art in possession of the present disclosure would recognize as operating to claim the subset of the memory space reserved by the initialization data bucket. As such, FIG. 11 illustrates the OS engine 900 having claimed the subset of the memory space in the main memory system 206 that was reserved by the boot services data bucket 402, and FIG. 12 illustrates the OS engine 1000 having claimed the subset of the memory space in the HBM system 204a that was reserved by the boot services data bucket 502. However, while the OS engines are described as claiming the subset of the memory space reserved by the initialization data bucket, other runtime subsystems may claim the subset of the memory space reserved by the initialization data bucket while remaining within the scope of the present disclosure as well. The method 300 then proceeds to block 310 where, during the runtime operations, the runtime engine provided by the processing system stores runtime data in at least a portion of the contiguous subset of the memory space. In an embodiment, at block 310, the OS engine 900 may operate to store runtime data in the subset of the memory space in the main memory system 206 that was previously reserved by the boot services data bucket 402, and the OS engine 1000 may operate to store runtime data in the subset of the memory space in the HBM system 204a that was previously reserved by the boot services data bucket 502.

Thus, systems and methods have been described that provide for the creation of a boot services data bucket that reserves a subset of the memory space provided by a memory system in a computing device for boot services data, and then the allocation of portions of that subset of the memory space for BIOS engines and firmware drivers in the computing device, and the use of those portions of that subset of the memory space by the BIOS engines and firmware drivers for which they were allocated in order to store boot services data during boot operations. Upon the completion of the boot operations such that the computing device enters a runtime environment, an Operating System (OS) engine in the computing device may then claim the subset of the memory space that was reserved by the boot services data bucket for runtime data, and store runtime data in that subset of the memory space during runtime operations. As will be appreciated by one of skill in the art in possession of the present disclosure, the use of the boot services data bucket during boot operations as described herein confines any fragmentation that results from the allocation and use of the memory space by the BIOS engines and firmware drivers to the subset of memory space reserved by the boot services data bucket, thus increasing computing device performance by reducing the need to review relatively large amounts of available memory space to find a contiguous region of the memory space for allocation, and requiring relatively smaller number of descriptors in a memory map to identify the memory space to the OS engine in a manner that prevents unexpected behavior with some OS engines that may result from, for example, limitations in their OS loader code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An initialization data memory space allocation system, comprising:
   a memory system having a memory space that includes an initialization data bucket that reserves a contiguous subset of the memory space for initialization data during initialization operations; and
   at least one processor that is configured to provide at least one first initialization engine that is coupled to the memory system, wherein each initialization engine included in the at least one first initialization engine is configured, during the initialization operations, to:
   allocate, for that initialization engine included in the at least one first initialization engine, a respective portion of the contiguous subset of the memory space in the memory system that is reserved by the initialization data bucket; and
   store initialization data in the respective portion of the contiguous subset of the memory space in the memory system that is reserved by the initialization data bucket and that is allocated by that initialization engine included in the at least one first initialization engine such that fragmentation of the contiguous subset of the memory space in the memory system that is reserved by the initialization data bucket that results from one or more operations of the at least one first initialization engine during the initialization operations is confined to the contiguous subset of the memory space in the memory system that is reserved by the initialization data bucket.

2. The initialization data memory space allocation system of claim 1, wherein the initialization data bucket is configured to reserve the contiguous subset of the memory space in the memory system for the initialization data such that a remaining subset of the memory space in the memory system that is contiguous is maximized.

3. The initialization data memory space allocation system of claim 1, further comprising:
a second initialization engine that is configured, during the initialization operations, to:
allocate, for the second initialization engine, a portion of the memory space in the memory system that is not reserved by the initialization data bucket; and
store initialization data in the portion of the memory space in the memory system that is not reserved by the initialization data bucket.

4. The initialization data memory space allocation system of claim 3, wherein the second initialization engine is further configured to allocate, for the second initialization engine, the portion of the memory space in the memory system that is not reserved by the initialization data bucket in response to one of:
determining that all of the contiguous subset of the memory space in the memory system that is reserved by the initialization data bucket has been allocated to the at least one first initialization engine; or
determining that the initialization data bucket does not include a contiguous memory space in the memory system that is sufficient for a memory allocation requirement of the second initialization engine.

5. The initialization data memory space allocation system of claim 1, further comprising:
a second initialization engine that is configured to:
report, to a runtime engine, the contiguous subset of the memory space in the memory system that is reserved by the initialization data bucket.

6. The initialization data memory space allocation system of claim 5, wherein the second initialization engine is further configured to:
report the contiguous subset of the memory space in the memory system that is reserved by the initialization data bucket in a memory map, wherein the confining of the fragmentation of the contiguous subset of the memory space in the memory system that is reserved by the initialization data bucket that results from the operation of the at least one first initialization engine during the initialization operations to the contiguous subset of the memory space in the memory system that is reserved by the initialization data bucket limits a number of descriptors in the memory map that are required to identify the memory space in the memory system to the runtime engine.

7. An Information Handling System (IHS), comprising:
a processing system that includes a processor that is configured to:
define an initialization data bucket that reserves a contiguous subset of a memory space provided by a memory system for initialization data during initialization operations; and
execute instructions to cause the processing system to provide:
at least one first initialization engine that is coupled to the memory system, wherein each initialization engine included in the at least one first initialization engine is configured, during the initialization operations, to:
allocate, for that initialization engine included in the at least one first initialization engine, a respective portion of the contiguous subset of the memory space in the memory system that is reserved by the initialization data bucket; and
store initialization data in the respective portion of the contiguous subset of the memory space in the memory system that is reserved by the initialization data bucket and that is allocated by that initialization engine included in the at least one first initialization engine such that fragmentation of the contiguous subset of the memory space in the memory system that is reserved by the initialization data bucket that results from one or more operations of the at least one first initialization engine during the initialization operations is confined to the contiguous subset of the memory space in the memory system that is reserved by the initialization data bucket.

8. The IHS of claim 7, wherein the initialization data bucket is configured to reserve the contiguous subset of the memory space in the memory system for the initialization data such that a remaining subset of the memory space in the memory system that is contiguous is maximized.

9. The IHS of claim 7, wherein the processing system is further configured to execute instructions to cause the processing system to provide:
a second initialization engine that is configured, during the initialization operations, to:
allocate, for the second initialization engine, a portion of the memory space in the memory system that is not reserved by the initialization data bucket; and
store initialization data in the portion of the memory space in the memory system that is not reserved by the initialization data bucket.

10. The IHS of claim 9, wherein the second initialization engine is further configured to allocate, for the second initialization engine, the portion of the memory space in the memory system that is not reserved by the initialization data bucket in response to one of:
determining that all of the contiguous subset of the memory space in the memory system that is reserved by the initialization data bucket has been allocated to the at least one first initialization engine; or
determining that the initialization data bucket does not include a contiguous memory space in the memory system that is sufficient for a memory allocation requirement of the second initialization engine.

11. The IHS of claim 7, wherein the processing system is further configured to execute instructions to cause the processing system to provide:
a second initialization engine that is configured to:
report, to a runtime engine, the contiguous subset of the memory space in the memory system that is reserved by the initialization data bucket.

12. The IHS of claim 11, wherein the second initialization engine is further configured to:
report the contiguous subset of the memory space in the memory system that is reserved by the initialization data bucket in a memory map, wherein the confining of the fragmentation of the contiguous subset of the memory space in the memory system that is reserved by the initialization data bucket that results from the operation of the at least one first initialization engine during the initialization operations to the contiguous subset of the memory space in the memory system that is reserved by the initialization data bucket limits a number of descriptors in the memory map that are required to identify the memory space in the memory system to the runtime engine.

13. The IHS of claim 7, wherein the at least one first initialization engine includes at least one firmware driver.

14. A method for allocating memory space for initialization data, comprising:
  defining, by a processing system that includes a processor and during initialization operations, an initialization data bucket that reserves a contiguous subset of a memory space provided by a memory system for initialization data during initialization operations;
  allocating, by each of at least one first initialization engine provided by the processing system and for that initialization engine included in the at least one first initialization engine during the initialization operations, a respective portion of the contiguous subset of the memory space in the memory system that is reserved by the initialization data bucket; and
  storing, by each of the at least one first initialization engine provided by the processing system, initialization data in the respective portion of the contiguous subset of the memory space in the memory system that is reserved by the initialization data bucket and that is allocated by that initialization engine included in the at least one first initialization engine such that fragmentation of the contiguous subset of the memory space in the memory system that is reserved by the initialization data bucket that results from one or more operations of the at least one first initialization engine during the initialization operations is confined to the contiguous subset of the memory space in the memory system that is reserved by the initialization data bucket.

15. The method of claim 14, wherein the initialization data bucket is configured to reserve the contiguous subset of the memory space in the memory system for the initialization data such that a remaining subset of the memory space in the memory system that is contiguous is maximized.

16. The method of claim 14, further comprising:
  allocating, by a second initialization engine provided by the processing system and for the second initialization engine during the initialization operations, a portion of the memory space in the memory system that is not reserved by the initialization data bucket; and
  storing, by the second initialization engine, initialization data in the portion of the memory space in the memory system that is not reserved by the initialization data bucket.

17. The method of claim 16, wherein the second initialization engine further allocates the portion of the memory space in the memory system that is not reserved by the initialization data bucket in response to one of:
  determining that all of the contiguous subset of the memory space in the memory system that is reserved by the initialization data bucket has been allocated to the at least one first initialization engine; or
  determining that the initialization data bucket does not include a contiguous memory space in the memory system that is sufficient for a memory allocation requirement of the second initialization engine.

18. The method of claim 14, further comprising:
  reporting, by a second initialization engine provided by the processing system and to a runtime engine, the contiguous subset of the memory space in the memory system that is reserved by the initialization data bucket.

19. The method of claim 18, wherein the second initialization engine further reports the contiguous subset of the memory space in the memory system that is reserved by the initialization data bucket in a memory map, wherein the confining of the fragmentation of the contiguous subset of the memory space in the memory system that is reserved by the initialization data bucket that results from the operation of the at least one first initialization engine during the initialization operations to the contiguous subset of the memory space in the memory system that is reserved by the initialization data bucket limits a number of descriptors in the memory map that are required to identify the memory space in the memory system to the runtime engine.

20. The method of claim 14, wherein the at least one first initialization engine includes at least one firmware driver.

\* \* \* \* \*